United States Patent Office 3,375,225
Patented Mar. 26, 1968

3,375,225
MODIFIED POLYPHENYLENE ETHERS
John J. Keane and Daniel W. Fox, Pittsfield, and Willem F. H. Borman, Dalton, Mass., assignors to General Electric Company, a corporation of New York
No Drawing. Filed Feb. 1, 1965, Ser. No. 429,651
7 Claims. (Cl. 260—47)

ABSTRACT OF THE DISCLOSURE

A polyarylene ether having pendant phenolic groups as substituents on the polymer backbone. The phenolic groups activate the polymer so that it may be crosslinked with crosslinking agents such as formaldehyde or with heat.

This invention relates to potentially reactive, heat reactive polyarylene ethers. More particularly, it relates to such ethers where a different type of polymer unit which is capable of supporting cross-linking is incorporated in the polymer chain.

As they are thermoplastic, polyphenylene ether resins, particularly the 2,6-disubstituted ether resins, have a number of outstanding physical and chemical properties. In particular, polyphenylene ether resins combine high tensile strength and tensile modulus with a high softening temperature, outstanding electrical insulating properties, and excellent resistance against water, steam, strong acids, and alkalies.

However, the polyphenylene ether resins also have a number of undesirable characteristics, such as those common to most thermoplastic materials. Their resistance to most common organic solvents is low. Aromatic and chlorinated hydrocarbon solvents dissolve phenylene oxide polymers, while other solvents and solvent vapors induce crazing in molded polyphenylene ether parts under stress, thus causing an almost complete loss of strength. The tensile properties of the resins decrease steadily with increasing temperature, and drop off sharply at about 200° C. Further, under prolonged stress, molded parts of polyphenylene ether tend to creep, causing permanent deformation.

It has been known that these disadvantages may be overcome by cross-linking the individual polymer molecules during, or after, the forming of the material into its final shape. Thus, if a sufficient number of cross-linking sites are present, the material can be cross-linked and will then no longer be soluble, but only swell, to a greater or lesser extent.

The phenomenon of solvent crazing is not fully understood as yet but appears to involve crystallization of the polymer molecules. As the mobility of the polymer molecule is limited by cross-linking, crystallization is no longer possible, and thus the problem of solvent crazing is removed. The limitation on molecular mobility also prevents the polymer from flowing, even above its melting point, thus preventing, to a large degree, creep and loss of tensile properties at increased temperature.

Polyphenylene ethers are, to a high degree, chemically inert, a desirable characteristic from a material standpoint. However, because of this inertness the prior art has experienced difficulty in introducing cross-links between the chains, and structurally different units generally, by simple chemical processes. For example, prolonged heating in air will render the polymer insoluble in aromatic or chlorinated hydrocarbon solvents, but the degree of cross-linking accomplished is quite low, and the materials produced swell to a considerable degree. Further, the prolonged heating causes the materials to degrade and become quite brittle. One very attractive method of cross-linking polyphenylene ether resins, and one used extensively in the field of phenolic resins, is by condensation through aliphatic aldehydes, especially formaldehyde which may be derived from hexamethylenetetramine, among other compounds. However, such a reaction requires activation of the aromatic ring, preferably by a hydroxyl substituent. Because no hydroxyl radical is present in standard polyphenylene ether resins, no appreciable cross-linking is achieved when these materials are heated in a mold in the presence of hexamethylenetetramine, nor are these resins found to be heat reactive.

In accordance with this invention we have discovered a novel polyarylene ether composition comprising pendant phenolic groups. The composition of our invention is potentially reactive and is readily cross-linked with formaldehyde, formaldehyde precursors, and other conventional cross-linking reagents, and has been further surprisingly found to be heat reactive. Further, according to our invention we have discovered that the potentially reactive, heat reactive polyarylene of this invention may be prepared by polymerization or copolymerization of certain phenolic oligopolymers. Still further, we have discovered that the potentially reactive, heat reactive polyarylene ethers of this invention may be prepared by the alkylation, with polyphenylene ethers, of certain phenols and phenolic oligopolymers.

The potentially reactive, heat reactive polyarylene ethers of our invention comprise from 1 to 100 mole percent of polymer units selected from the group consisting of (1A)

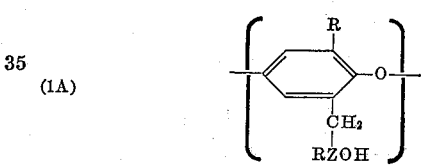

and (1B)

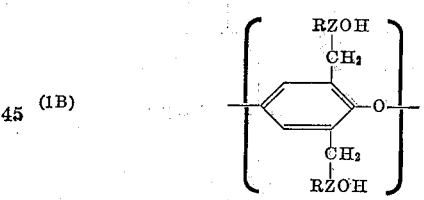

where —(RZOH) represents a monovalent substituent selected from the group consisting of monocyclic phenol radicals and ring-substituted novolakyl radicals, there being not greater than nine phenolic hydroxyls per polymeric unit, and each R is selected from the group consisting of hydrogen and methyl.

The monocyclic phenol radicals are preferably those represented by the formula (2)

where R is selected from the group consisting of hydrogen and methyl.

The ring-substituted novolakyl radicals are defined as the monovalent radicals of acid catalyzed phenol-aldehyde addition products having the unsatisfied valence attached to the ortho or para position of a phenolic ring. Typical examples of ring-substituted novolakyl radicals are:

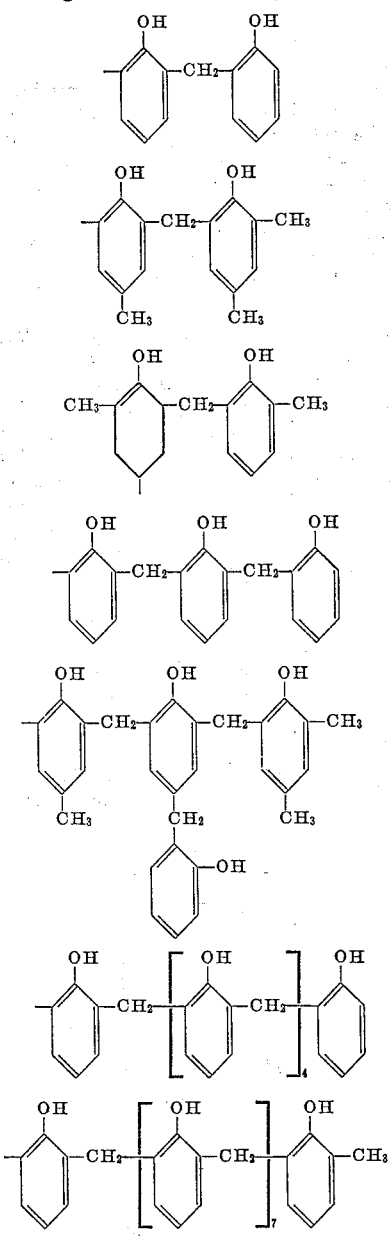

The polymer of this invention may further comprise from 0 to 99 mole percent of further polymer units represented by the formula (3)

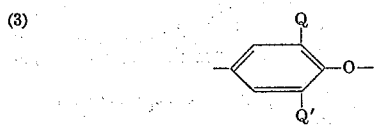

where Q and Q' are selected from the group consisting of hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals free of an aliphatic tertiary alpha-carbon atom, and halohydrocarbonoxy radicals having at least two carbon atoms between the halogen atom and phenol nucleus and being free of an aliphatic tertiary alpha-carbon atom. Q and Q' are identical with the substituents Q and Q' in U. S. Patent No. 3,306,875 of Allan I. Hag. In general, it is preferred that the substituents Q and Q' represent lower alkyl substituents such as methyl.

In a preferred embodiment the composition of this invention comprises from 1 to 100 mol percent of polymer units having a formula selected from the group consisting of (4A)

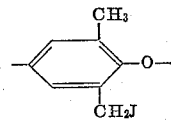

and (4B)

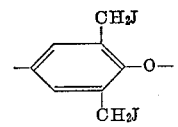

where J is a monovalent phenol radical represented by the formula (4C)

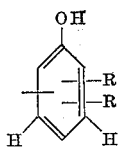

and each R is selected from the group consisting of hydrogen and methyl. The polyphenylene ether of Formulae 4A and 4B may further comprise from 0 to 99 mol percent of the copolymeric units of Formula 3. In practice it has been found that it is most frequently preferable to have the copolymeric units of Formula 3 present within the range of 80 to 95 mol percent of a polymer comprising the units of Formulae 4A and 4B.

In one mode of practice of this invention the potentially reactive, heat reactive polyarylene ethers are prepared by the solution or emulsion polymerization of an acid catalyzed phenolic oligopolymer in the presence of oxygen and the complex of a basic cupric salt and an amine. The copper amine catalyst is the same as disclosed in U.S. Patents of Allan S. Hay, Nos. 3,306,874 and 3,306,875 in corporated into this specification by reference. The phenolic oligopolymers which may be polymerized by the process of this invention are represented by the formulae (5A)

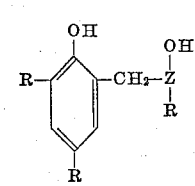

and (5B)

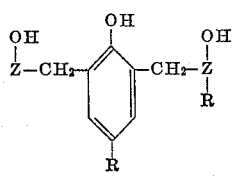

where —(RZOH) and each R are defined above, there being at least one unsubstituted (i.e., hydrogen substituted) position para to a phenolic hydroxyl and there further being not greater than 10 phenolic hydroxyls per oligopolymer.

The phenolic oligopolymers of Formulae 5A and 5B can thus be characterized as acid catalyzed phenolaldehyde reaction products which are otherwise known in the art as novolak resins, with the groups —(RZOH) being properly defined as ring-substituted novolakyl radicals. A further discussion of the novolak resins may be found in Martin, The Chemistry of Phenolic Resins, John Wiley and Sons, New York, 1956.

Typical examples of the novolak resins which are useful in the practice of this invention are illustrated below:

(6)

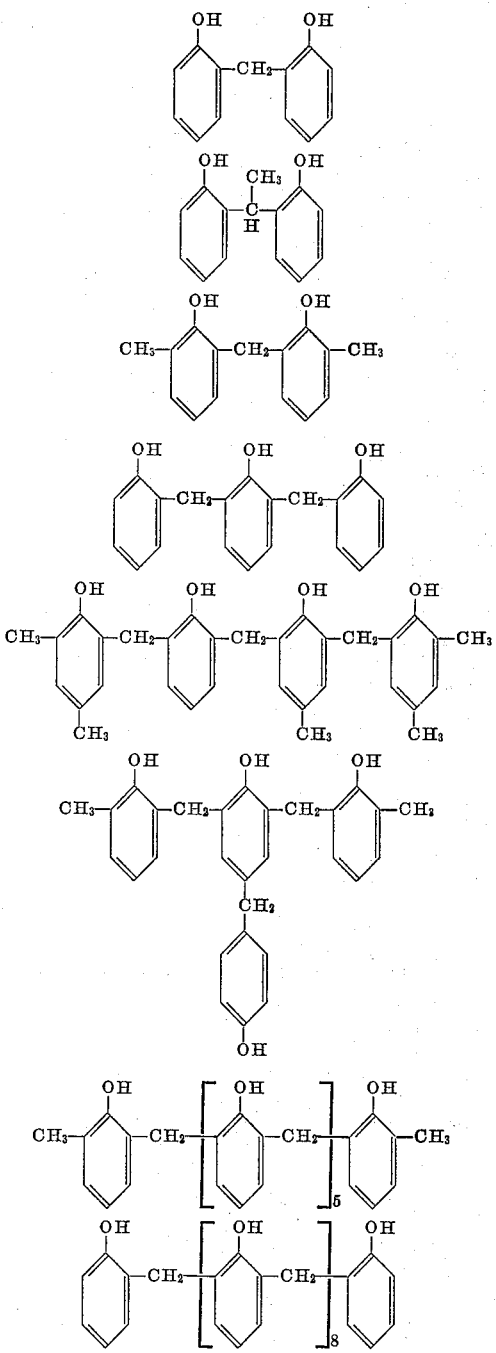

The novolak resins of Formulae 5A, 5B, and the examples specified above may be copolymerized in the presence of oxygen and a copper-amine catalyst with from 0 to 99 mol percent of a second phenolic monomer represented by the formula (7)

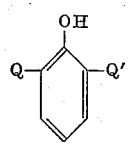

where Q and Q' are selected from the group consisting of hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals free of an aliphatic tertiary alpha-carbon atom, and halohydrocarbonoxy radicals having at least two carbon atoms between the halogen atom and phenol nucleus and being free of an aliphatic tertiary alpha-carbon atom. The phenols of Formula 7 are identical with the similarly designated phenolic monomers disclosed by Hay in his Patent No. 3,306,875. It is preferred that each of substituents Q and Q' be lower ($C_1$ to $C_4$) alkyl groups.

In a preferred mode of practice of this invention the potentially reactive, heat reactive polymer are prepared by a process of alkylating, with a polyphenylene ether, a phenol of the formula (8)

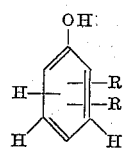

where each R is selected from the group consisting of hydrogen and methyl. Typical examples of phenols falling within the scope of Formula 8 are phenol, ortho-cresol, paracresol, 2,4-xylenol, 2,6-xylenol, etc.

The polyphenylene ether with which the phenols of Formula 8 may be alkylated is preferably a poly(2,6-dimethylphenylene-1,4) ether of the type disclosed in the above noted Patent No. 3,306,875; and further is preferably one of the lower molecular weight species therein disclosed. From 1 to 100 mol percent of the polymeric units of the poly(2,6-dimethylphenylene-1,4) ether alkylate at least a mole equivalent (perpolymeric unit) of the phenols of Formula 7 to yield a potentially reactive, heat reactive modified polyphenylene ether comprising polymeric units selected from those represented by Formulae 4A and 4B and further comprising from 0 to 99 mol percent of (2,6-dimethylphenylene-1,4) oxy units. The alkylation procedure for preparing the polymers of this invention is preferably a two-step reaction involving first the side-chain chlorination of the polyphenylene ether and finally the reaction of a phenol with the chlorinated polymer. The chlorinated polymeric intermediate is preferably prepared by the method disclosed by Hay in his U.S. Patent No. 3,262,911. In the process disclosed by Hay, the poly(2,6-dimethylphenylene-1,4) ether is halogenated to yield a polymer of a benzylic halogen content predetermined by the weight of halogen reacted.

We have found that, in general, any Lewis acid-type catalyst is satisfactory in the alkylation process. It is further a discovery of this invention that the alkylation of the phenols of Formula 8 with the halogenated poly(2,6-dimethylphenylene-1,4) ether is autocatalytic which is to say that the hydrogen halide generated through the reaction is in itself catalytic. In the preferred case of the chlorinated polymer it was found quite sufficient to use as a starter a small amount of dry hydrogen chloride gas to initiate the reaction which becomes self-sustaining (because of hydrogen chloride generated) provided the alkylating polymer contains a minimum of 4.5% of benzylic chlorine. The alkylation reaction is allowed to proceed until the calculated amount of hydrogen chloride has been liberated (as measured, for example, by absorption in alkaline solution and titration). For each chlorine atom substituted on the 2 and/or 6 methyl groups there will then be reacted 1 mole of a phenol. Since the chlorination is a random process, it is, of course, impossible to say whether one or both of the methyl groups on any one polymeric unit are halogenated. Accordingly, there may be one or two pendant phenolic groups introduced into any one polymeric unit by the alkylation step, thus yielding the combination of polymeric units designated by Formulae 4A and 4B. The polymeric units resulting from the alkylation step will, however, represent up to 100 mol percent of polymeric units present in the polymer. It is preferred, however, that polymeric units 4A and 4B comprise in combination from 5 to 20 mol percent of all polymeric units forming the polymer. It can be readily seen that this will require alkylation of a phenol (preferably present in an excess) with a poly (2,6-dimethylphenylene-1,4) ether containing from 5 to 40 benzylic chlorine atoms per 100 polymeric units (1.5–12% benzylic chlorine). The subsequent alkylation of the phenol can be most conveniently performed by refluxing the chlorinated polymer in an excess of the selected phenol. It is generally preferred that the phenol selected be phenol ($C_6H_5OH$).

The following examples are further illustrative of the practice of this invention:

EXAMPLE 1

Five grams of cuprous chloride were suspended in 200 ml. of pyridine contained in a 3-neck round bottom flask equipped with a stirrer, a gas inlet, and a reflux condenser. While the suspension was stirred vigorously, an excess of oxygen was passed through for a period of 15 minutes causing the copper salt to go into solution. To this solution were added 9.2 grams of a novolak (having a molecular weight of approximately 500) dissolved in 75 ml. of pyridine. Excess oxygen was passed through the vigorously stirred solution for one-half hour. The reaction mixture was then added to one liter of methanol and a solution of 38% aqueous HCl was added in quantity sufficient to make the mixture strongly acidic. The precipitate was filtered off, washed with methanol and re-dissolved in a mixture of 250 ml. of chloroform and 50 ml. of methanol. The resulting solution contained some insoluble gel which was filtered off and dried. The dried gel weighed 2.7 grams. The filtrate was distilled to remove chloroform, 150 ml. of methanol was added, and the resulting precipitate filtered off and dried. The product weighed 4.5 grams. Its infrared spectrum showed a distinct absorption characteristic for phenol ether polymer. This absorption spectrum was absent in the original novolak.

EXAMPLE 2

Ten grams of the novolak resin used in Example 1 and 10 grams of 2,6-dimethylphenol were dissolved in 200 ml. of pyridine containing 2 grams of cuprous chloride. Oxygen was passed through the rapidly stirred solution for a period of one hour after which the reaction mixture was added to 1 liter of methanol. The precipitate was filtered off, resuspended in 200 ml. of methanol, the suspension acidified with 38% aqueous HCl and filtered. The precipitate was dissolved in 200 ml. of chloroform, the solution filtered and added to 1 liter of methanol containing 25 ml. of 38% HCl. The precipitate was filtered off, washed with methanol, and dried. The yield was 11 grams. The infrared spectrum, as well as quantitative acetylation, showed an approximate hydroxyl content of 4% corresponding to the presence of approximately 35% novolak incorporated in the copolymer.

EXAMPLE 3

Using the same apparatus as in Example 1, 5 grams of cuprous chloride were dissolved in 200 ml. of pyridine. Oxygen was passed through the mixture for a period of one-half hour. Ten grams of 2,2'-dihydroxy-3,3'-dimethyl-diphenylmethane was then added to the solution and oxygen was passed through the vigorously stirred mixture for an additional hour. The temperature was maintained between 25° and 29° C. with a water bath. The reaction mixture was added to 2 liters of water acidified with 350 ml. of 38% HCl and the precipitate filtered off. The precipitate was re-dissolved in 500 ml. of chloroform, the solution filtered and the filtrate added to 2 liters of methanol containing 25 ml. of 38% HCl. The insoluble residue was filtered off, washed with methanol, and dried. This residue weighed 3.3 grams and had an intrinsic viscosity (in chloroform at 30° C.) of 4.5 dl./gram. The chloroform-methanol filtrate was heated to distill off the chloroform and the remaining solution was added to 1 liter of water. The precipitated product was filtered off, washed with 20% aqueous methanol, and dried. The yield was 6.5 grams of a polymer having an intrinsic viscosity (in chloroform at 30° C.) of 4.7 dl./gram.

EXAMPLE 4

Two grams of cuprous chloride and 5 ml. of diethylamine were dissolved in 75 ml. of a 3 to 1 chlorobenzene-methanol solution contained in the apparatus of Example 1. Oxygen was passed through for one-half hour, after which 10 grams of the same novolak as in Example 1, dissolved in 200 ml. of a 3 to 1 chlorobenzene-methanol solution, were rapidly added. Immediately thereafter there was started drop-wise addition of 10 grams of 2,6-dimethylphenol, dissolved in 100 ml. of 3 to 1 chlorobenzene-methanol solution, while oxygen was continuously passed through. The addition of 2,6-dimethylphenol solution took 18 minutes, after which oxygen was passed through for one additional hour. The reaction mixture was then added to 2 liters of methanol containing 50 ml. of 38% HCl. The precipitate was filtered off, washed with methanol, and dried. The yield was 15 grams. Approximately 2 grams of the product was molded between aluminum foil in a heated press at 540° F. for a total time of 6 minutes. A flexible brown sheet resulted which did not swell in chlorobenzene, thus indicating a high degree of cross-linking. This heat curing effect is a surprising and unexpected property of the polymers of this invention. When in a substantially identical procedure this experiment was repeated with 5 grams of novolak and 15 grams of 2,6-dimethylphenol there resulted a product having virtually identical properties.

EXAMPLE 5

Three hundred grams of redistilled phenol was charged into a 3-neck flask equipped with stirrer, reflux condenser, and gas entry tube. The reflux condenser was equipped with a tube to provide absorption (of any evolved gas) in 200 cc. of 1 N NaOH solution. Twenty grams of chlorinated poly(2,6-dimethylphenylene) ether of intrinsic viscosity 0.4 dl./gram in $CHCl_3$ and 22% benzylic chlorine (corresponding to 1 chloro-methyl group per each monomer unit) was added to the phenol and a flow of nitrogen introduced through the gas entry tube. The reaction was run at reflux temperature and periodically a sample of the NaOH solution was titrated for $Cl^-$. After three hours, the $Cl^-$ concentration in the NaOH solution had stopped increasing and the reaction was cooled. The polymer was recovered by precipitation with methanol. A film cast from a solvent comprising equal volumes of toluene and ethanol became insoluble after heating in an air circulating oven for a period of five minutes at 250° C. The linear degree of swelling which is used as a measure of the density of cross-links (see for example Principles of Polymer Chemistry, P. J. Flory, Cornell University Press, 1953, pp. 577–580) in the cured matrix was found to be 22% in the above-mentioned solvent. Another sample was mixed with hexamethylenetetramine (10%) and cured for ten minutes at 175° C. In this case, the polymer was so tightly cross-linked that no swelling could be observed when the cured film was immersed in the same solvent.

EXAMPLE 6

In another example of the alkylation of phenol by the chlorinated polymer, 300 grams of pure phenol were reacted with 40 grams of chlorinated polymer containing only 3% benzylic chlorine and of intrinsic viscosity 0.93 dl./gram in $CHCl_3$. The same apparatus as that of Example 5 was used, but dry HCl gas was introduced instead of nitrogen. The reaction was run at 180° C. for 3 hours. A yield of 33 grams was obtained when the polymer was precipitated with methanol. This material was found to be soluble in chloroform. A film cast from this solvent and subsequently cured in a circulating air oven at 200° C. for ½ hour was no longer soluble but gave a linear swelling in CHCl₃ of 103%, corresponding to a molecular weight between cross-links of 8700.

EXAMPLE 7

In another example of alkylation of phenol with chlorinated poly(2,6-dimethylphenylene) ether, 45 grams of chlorinated polymer with benzylic chlorine content of 4.9% and intrinsic viscosity of approximately 0.40 dl./gram in CHCl₃ was reacted with 300 grams of phenol under the same conditions of Example 5. The yield of polymer was found to be 47 grams (theoretical 49 grams). A film cast from chloroform and cured at 200° C. for ½ hour gave a linear swelling in CHCl₃ of 113% corresponding to a molecular weight between cross-links of 4700.

EXAMPLE 8

In another material made by the same procedure of Example 7 above but using a chlorinated polymer of 10% benzylic chlorine and intrinsic viscosity of approximately 0.40 dl./gram, the linear swelling in CHCl₃ for the cured film was 36% corresponding to a molecular weight between cross-links of 900.

We have set forth above certain striking illustrations of the ease of curing the polymers of this invention by means of either chemical reagents or the application of heat. The most convenient curing agents, and those which have been found most generally satisfactory, include formaldehyde and the formaldehyde precursors, a designation which is intended to comprise art recognized formaldehyde yielding materials as hexamethylenetetramine, paraformaldehyde, trioxymethylene, etc. In general, hexamethylenetetramine is the preferred formaldehyde precursor for use with the polymers of this invention and in every case where it has been used subsequent swelling measurements have indicated an extremely tight cure. Curable formulations may include the polymer and curing agent in solution, suspension, or as a dry mix. Because of these properties such compositions are exceptionally useful over the entire range of resin technology. They may be cast from solution, extruded, or otherwise shaped prior to the curing step and they may also be simultaneously cured with casting, molding, etc., in order to yield insoluble cross-linked shaped bodies.

Other curing agents which have been found to be useful include formaniline, heat reactive phenolic resins, the ester interchange-type reagents such as diphenyl carbonate or diphenyl silane diol, epoxides, and other conventional or convenient cross-linking reagents. However, because of the surprising heat curability of the polymers of our invention, it is often most convenient to formulate curable compositions therefrom in the absence of such curing agents except for certain specialized applications. The heat curable compositions can be subjected to any of the conventional casting, coating, working, and shaping procedures and either simultaneously or subsequently heat treated to produce insoluble, infusible, and non-swelling shapes and products. Because of their unusual thermal stability the cross-linkable polymers of this invention have been found to be especially valuable in varnish and enamel technology. For this application, our polymers are solution-coated upon a substrate and cured by heating, by the use of curing agents, or by the appropriate combinations thereof. The cured coatings are especially advantageous because of their high tensile modulus, their extensibility and flexural strength and, in general, their superior aging resistance, as well as their superior solvent resistance and an excellent adhesion to metallic surfaces. Because of these qualities and their hydrolytic stability and excellent electrical character, the polymers of our invention have an especially wide range of utility in the area of protective coatings and electrical insulation.

It can thus be seen that the cured polymers of this invention have a particularly interesting combination of properties which make them especially attractive materials in electrical applications or for use under extreme conditions of pressure, temperature, humidity, and corrosiveness. They have excellent resistance to oxidative and hydrolytic conditions including heat, steam, acids, alkalies, other reactive chemicals, and solvents, together with good physical properties such as a high tensile strength, high tensile modulus, and excellent impact resistance. Prior to curing they may be extruded, molded, cast, or shaped by any other method so as to form various articles and stock materials, including sheets, films, tapes, strands, ribbons, rods, tubing, pipe, laminates, coated products, etc. Coatings, upon any convenient substrate, may be formed by extrusion, calendering, casting, spraying, etc., as well as by deposition from solution in a volatile solvent or from aqueous dispersion. Further, the material may be utilized as such or in combination with inert fillers, modifying agents, etc., such as dyes, pigments, stabilizers, plasticizers, accelerators, etc., and other materials commonly employed with thermoplastic and thermosetting polymers. When used in combination with glass fibers, or other fibrous reinforcement both woven and non-woven, there has been found to result a laminated or coated sheet or tape having excellent impact resistance and breaking strength.

While specific embodiments of this invention have been shown and described, other modifications and variations are possible in view of the above teachings. It is therefore to be understood that any changes or improvements are within the spirit and scope of this invention as defined by the appended claims.

What we claim as new and desire to secure by Letters Patent of the United States is:

1. A polyphenylene ether consisting essentially of
   (1) from 1 to 100 mol percent of polymer units selected from the group

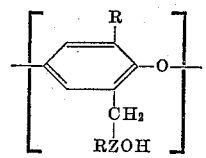

and

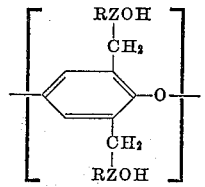

where —RZOH is selected from the group consisting of monocyclic phenol radicals and ring substituted novolakyl radicals, there being no greater than nine phenolic hydroxyls per polymer unit, and each R is selected from the group consisting of hydrogen and methyl and (2) from 0 to 99 mole percent of second polymer units represented by the formula

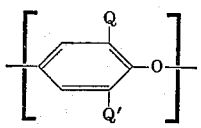

where Q and Q' are selected from the group consisting of hydrocarbon radicals free of a tertiary alpha-carbon atom, halohydro radicals having at least two carbon atoms between the halogen atom and phenol nucleus and being free of a tertiary alpha-carbon atom, hydrocarbonoxy radicals free of an aliphatic tertiary alphacarbon atom, and halohydrocarbonoxy radicals having at least two carbon atoms between the halogen atom and phenol nucleus and being free of an aliphatic tertiary alpha-carbon atom.

2. The polyarylene ether of claim 1, where —(RZOH) is a monocyclic phenol radical represented by the formula

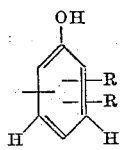

where each R is selected from the group consisting of hydrogen and methyl.

3. A polyphenylene ether consisting essentially of
(1) from 1 to 100 mol percent of polymer units selected from the group consisting of

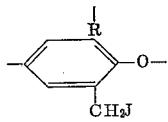

and,

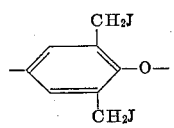

where J is the radical

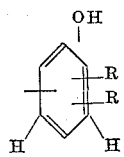

and each R is selected from the group consisting of hydrogen and methyl and
(2) from 0 to 99 mole percent of second polymer units represented by the formula

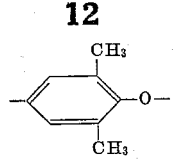

4. The polyphenylene ether of claim 3 where the second polymer units constitute from 80 to 95 mole percent of the polymer.

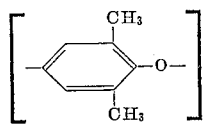

5. A crosslinked polyphenylene ether formed by exposing the polymer of claim 1 to an elevated temperature for a time sufficient to render the polymer insoluble in chlorobenzene.

6. Crosslinked polyarylene ether that is the reaction product of the polymer of claim 1 and a formaldehyde precursor.

7. The crosslinked polymer of claim 6 wherein the formaldehyde precursor is hexamethylenetetramine.

References Cited

UNITED STATES PATENTS 3,262,911   7/1966   Hay _____ 260—47

FOREIGN PATENTS 930,993   7/1963   Britain.

OTHER REFERENCES

Martin, the Chemistry of Phenolic Resins, John Wiley and Sons, New York, 1956. Page 153 relied on.

WILLIAM H. SHORT, *Primary Examiner.*

M. GOLDSTEIN, *Assistant Examiner.*